United States Patent Office 3,443,981
Patented May 13, 1969

3,443,981
METHOD OF FORMING PROTECTIVE COATINGS FROM CLAY-TYPE EMULSIONS OF BITUMINOUS MATERIAL
Arnold J. Hoiberg, Montville, John P. Orsulak, Short Hills, and Philip C. Bick, Passaic, N.J., assignors to The Flintkote Company, New York, N.Y., a corporation of Massachusetts
No Drawing. Filed June 15, 1965, Ser. No. 464,213
Int. Cl. B44d 1/44; B01j 13/00
U.S. Cl. 117—62
9 Claims

ABSTRACT OF THE DISCLOSURE

The normal rate of coagulation and setting-up of an aqueous emulsion of bituminous material, made with colloidal clay as the emulsifying agent, is accelerated by diffusing a relatively small amount of an organic amine through the deposited layer on the surface of a substrate. Thereby the layer reaches a condition of resistance to the effects of rainfall more rapidly than is otherwise the case.

This invention relates to protective coatings, and is more particularly concerned with improvements in the method of forming protective coatings on surfaces exposed to the weather.

The invention pertains especially to the formation of such coatings from aqueous emulsions of waterproof material such as asphalt, cold tar pitch or other bituminous materials, or from aqueous dispersions of resinous or plastic material.

Still more particularly, the invention is concerned with the provision of protective coatings constituted essentially of the dry deposits or residues of aqueous emulsions of bituminous or other binder material, wherein the emulsion is of the type produced with clay-like material as the emulsifying agent.

The term "clay-like material" used herein with reference to the emulsifying agent for the bitumen or other material is intended to include any of the well-known colloidal clays such as Crossman clay, bentonite, and the like, which have long been used in the production of aqueous emulsions of such materials. These emulsions, generally referred to as being of the "clay-type," possess a number of characteristics and properties which distinguish them from aqueous emulsions of such materials made with soap or soap-like material as the emulsifying agent. These latter are generally referred to as "soap-type" emulsions. Chief among the characteristics which distinguish the clay-type emulsions from soap-type emulsions are the stability of the clay-type emulsions to the action of electrolytes, and the ability of their dried films to withstand flow at temperatures considerably in excess of the melting point of the bitumen or other emulsified binder, especially those made with bentonite as the emulsifying agent.

Representative of "clay-type" emulsions with respect to which the invention is of particular utility are aqueous emulsions produced by the use of bentonite as the emulsifying agent. Emulsions of this character are described, for example, in Kirschbraun Patents Nos. 1,506,371; 1,615,303; 1,616,904; and 1,734,437.

The "clay-type" emulsions of asphalt and other bitumens are of considerable advantage for various industrial uses, and are especially advantageous for use as protective coatings on surfaces exposed to the weather, by reason of the "non-flowing" property of their water-free films, as above mentioned. However, they suffer an inherent disadvantage from the standpoint of the relatively lengthy time required for a deposited film or layer thereof to become set up into a sufficiently coagulated or coalesced state to prevent the film from being deteriously affected, or even washed off the substrate surface, by the action of water, such as from a relatively heavy rainfall, as may occur shortly after the emulsion layer has been deposited on a weather-exposed substrate. In this connection, it may be pointed out that in commercial practice, the aqueous, continuous phase of these emulsions constitutes about 40% of the total weight of the emulsion.

The evaporation of water from, and the resultant setting up of films or layers of this type of emulsion is dependent principally upon the film thickness, the ambient temperature, relative humidity and wind velocity.

Hence, when these clay-type emulsions are utilized as protective coatings for surfaces exposed to the weather, especially when applied in layers of a thickness of the order of $\frac{1}{16}''$ or more, as is frequently necessary, the occurrence of substantial rainfall shortly after the emulsion layer has been applied results in deleterious effects upon the emulsion film, even though a fairly good portion of its original water content has evaporated before the rainfall occurs. In more pronounced instances, as when a relatively heavy rainfall occurs soon after the layer of emulsion has been applied to the surface of the substrate, some or even all of the emulsion layer may be washed off from the surface by the rainfall.

The principal object of the invention, accordingly, is to provide a method for obtaining protective coatings from "clay-type" emulsions of bituminous or other binder material, which are of a character obviating their susceptibility to such deleterious action of rainfall.

Stated briefly, the foregoing object of the invention is attained by accelerating the normal rate of coagulation and setting-up of a layer of the aqueous emulsion deposited on a substrate surface. This result is obtained, in accordance with the invention, by causing any of a variety of agents, more specifically hereinafter set forth, to diffuse into and through the deposited layer of the aqueous emulsion.

A further object of the invention is to provide a method for obtaining protective coatings from "clay-type" emulsions which become substantially fully resistant to the action of the rainfall within a relatively brief period of time after the emulsion layer has been deposited, thus not requiring the substantially complete elimination of the total water content of the emulsion in order to bring about such rainfall resistant property.

By means of the invention, it becomes possible to provide protective coatings deposited from layers of aqueous emulsions of the "clay-type" which reach a state of satisfactory resistance to the action of rainfall in a period of less than 30 minutes, as compared to more than 10 hours normally required.

A still further object of the invention is to provide protective coatings of the character above set forth, without substantially affecting the other desirable properties normally characteristic of "clay-type" aqueous emulsions of bitumen or the like.

Preliminary to an explanation of the concept underlying thhe invention and of the results thereby attained, it may be pointed out that the colloidal clays utilized as the emulsifying agent in the conventional methods of producing "clay-type" emulsions are of hydrophilic character. Consequently, the clay attracts and holds the water contained in a deposited layer of the emulsion rather tenaciously, so that a relatively long period of drying time at normal ambient temperatures is required for the final evaporation or elimination of the water therefrom. This effect is more particularly evident when bentonite-type clays are employed as the emulsifying agent. The hydrophilic property of the bentonite or other colloidal clay thus tends to retard coalescence of the dispersed bituminous particles, since it is the last or final amounts of the water initially present in the film which is the most difficult to evaporate from the colloidal system.

Because of this characteristic, the deposited layers of "clay-type" emulsions are susceptible to rapid re-wetting, at the stages prior to and until they are thoroughly dried.

The invention, as hereinafter more fully set forth, achieves its principal objects through the use of certain agents which act to displace or drive the water from around the clay particles and simultaneously to transform them from their normal hydrophilic character to a hydrophobic and oleophilic character. By virtue thereof, the colloidal system of which the deposited layer is composed is made rapidly, usually in not more than 30 minutes after the emulsion layer has been applied, resistant to the action of rainfall. To obtain such a result when using aqueous emulsions of the "clay-type" is highly unexpected.

In the practice of the invention, any one of a number of certain agents, hereinafter more fully set forth, are caused to diffuse rapidly into and through the layer of the aqueous emulsion deposited on a substrate surface.

One method by which such diffusion of the treating agents may be effected is by applying the treating agent to the substrate surface before the layer of the emulsion is deposited thereon so that the agent may diffuse from the substrate surface into and through the subsequently deposited emulsion layer.

Another method for effecting such diffusion of the treating agent is by applying the same over the exposed surface of the previously deposited layer of the aqueous emulsion so that the agent may diffuse from that surface into and through the emulsion layer.

In instances where particulate material of the character of glass fiber, mineral wool fiber, asbestos fiber, or organic fiber, is employed for reinforcing the strength of the dried film of the layer of emulsion, and for that purpose is incorporated therein by separately but simultaneously spraying the emulsion and the particulate material onto the substrate surface, the treating agent may be sprayed onto the surfaces of the particulate material, as by spraying the same onto the particulate material during the spraying of the materials but before they strike the substrate surfaces. In such cases the treating agent will migrate into and through the layer of fiber-reinforced emulsion deposited on the substrate surface and exert the action herein described.

The rapid diffusion of the treating agent through the sprayed emulsion film is sufficient to cause a "tightening" of the entire film by separating the emulsion into its water and bitumen phases, and to bring into play the above-mentioned hydrophobic-oleophilic character of the clay particles. The treatment does not, however, increase the time required to cause final coalescence of the film.

The treating agent employed in the practice of the invention may be any of the following: (1) primary, secondary and tertiary aliphatic amines; (2) alkyl-aromatic amines; (3) fatty amides of aliphatic and disubstituted diamines; (4) quaternary ammonium bases derived from fatty amides of disubstituted diamines; (5) fatty amides derived from benzimidazolines; (6) basic pyridinium compounds and salts thereof; (7) basic quaternary sulfonium, phosphonium and ammonium compounds; (8) betaine compounds of quaternary ammonium; (9) urethane salts of alkylene diamines; (10) polyalkylene polyamines and their quaternary ammonium derivatives; and (11) polyalkanol polyethanolamines.

Representative of the substances grouped above are diethylene triamine; n-propylamine; triethylene tetramine; dodecylamine; dodecylaniline; undecylimidazoline; oleylaminodiethylamine; triethyl cetyl ammonium chloride; octadecyl methylene pyridinium acetate; methyl sulfate of dimethyl octadecyl sulfonium; hydrochloride of dimethyloctadecylmethyl aminoacetate; dimethylphenylbenzyl ammonium chloride; menthol diurethane hydrochloride; polyethylene diamine; and polypropanol polyethanolamine.

The substances above enumerated are each suitable for the purposes of the invention when employed in amounts within the range of about 0.05% to 0.5%, by weight, based on the weight of the deposited layer of the emulsion.

Of the substances enumerated, diethylene triamine (usually referred to as D.T.A.) appears to be among the most preferred and is particularly effective when used for the treatment of layers of bituminous emulsions deposited by spray application methods. This treating agent exhibits ability to diffuse especially rapidly through the deposited layer of the emulsion, thereby to cause a rapid and prompt coagulation of the emulsion in the layer, with separation of the emulsion into its water (external) phase and bitumen or other binder (internal) phase, with a substantially corresponding prompt coalescence of the dispersed bitumen particles. Thus, the emulsion is not susceptible to being washed from the substrate surface by a rainfall occurring even as soon as one-half hour after the emulsion layer has been deposited on the surface.

As will be evident from the foregoing, the treating agents employed according to the invention do not serve to dry the deposited films of the emulsion or to render it water-proof, but rather to break or separate the emulsion into its external water phase and internal binder phase and to render the clay particles hydrophobic and oleophilic as above mentioned. Elimination of the water from the deposited film of the emulsions acted upon by the treating agent is still necessary in order to dry the deposited film and cause its final coalescence so that it becomes water-tight.

In Table I herebelow, there is shown the data with respect to the effect of a variety of treating agents on a commercially available bituminous emulsion made with bentonite as the emulsifying agent, when deposited on a substrate surface in a layer 0.16″ thick in the wet state, followed (in each instance except the control specimen) by the hand spraying of the treating agents over the surface of the deposited emulsion layer. The data with respect to rainfall resistance shown in Table I are the results obtained by testing each of the specimens according to the standard test for rainfall resistance, after four hours air-drying of the layers at 77° F. In this test procedure, there is employed a ring stand; a one-gallon can with two spaced holes of .0×40 inch diameter, formed in the bottom thereof; a block having a 45° sloping face; a stop watch; paper towels; and distilled water. To conduct the test, the can is mounted on the ring stand so that the distance between the holes and the surface of the specimen under test at the point of impingement is 9 inches. The can is calibrated to deliver 0.6 inch of distilled water in 10 minutes. A paper towel is placed over the sloping face of the block, and over the paper is placed the specimen to be tested. The height of the can is checked, distilled water is poured into the can to reach a calibration mark of 3.75 inches, and at the same time, the stop watch is started. The time at which a stain of the black emulsion is seen on the paper towel is recorded, as is also the time required for either of the two water streams to penetrate through the emulsion film. If no failure is observed in 10 minutes, the test is discontinued and the film is recorded as having passed the test.

TABLE I.—EFFECT OF TREATING AGENTS ON A STANDARD COMMERCIAL BITUMINOUS EMULSION [1]

| Treating Agent | Action of Treating Agent Upon Deposited Layer of Emulsion | Rainfall Resistance | | Rating |
|---|---|---|---|---|
| | | Start of Stain, Time, Min. | Wash-off to Expose Substrate, Time, Min. | |
| None (Control) | | 00:10 sec | 01:09 sec | Fail. |
| Duomeen T [2] | Thickens and separates | Sl. Stain | 10:00÷ | Pass. |
| Tergitol NPX [3] | do | 2:00 | 10:00÷ | Do. |
| Ethoduomeen T/13 [4] | do | Sl. Stain | 10:00÷ | Do. |
| Methylene Blue | Thickens and separates—Sl. Flock | do | 10:00÷ | Do. |
| Auramine Yellow O [5] | Sl. Color Change—Thickens and Coagulates | do | 10:00÷ | Do. |
| Catanac SN [6] | Thickens—Churd and Floc Forms | do | 10:00÷ | Do. |
| Catanac SP [7] | Thickens and Separation | do | 10:00÷ | Do. |
| N-propylamine | Thickens | do | 10:00÷ | Do. |
| T-butylamine | Thickens and Sl. Separation | do | 10:00÷ | Do. |
| T-octylamine | Thickens and Coagulates | do | 10:00÷ | Do. |
| Methane diamine | Thickens | None—Slight | 10:00÷ | Do. |
| Diethylene Triamine D.T.A. | Thickens and Separates | do | 10:00÷ | Do. |
| Triethylene Tetramine T.E.T.A. | do | do | 10:00÷ | Do. |

[1] Approx. 55% steam-refined asphalt of 115° F. softening point and 100–110 penetration at 77° F.; 3% Wyoming bentonite; and 42% water.
[2] N-tallow trimethylene diamine (Armour Industrial Chem. Co.).
[3] Nonyl phenyl polyethylene glycol ether (Union Carbide).
[4] A cationic tertiary diamine (Armour Industrial Chem. Co.).
[5] Color Index—C.I. Basic Yellow 2; C.I. 41,000 $(CH_3)_2NC_6H_4(C:NH)C_6H_4N(CH_3)_2 \cdot HCl$.
[6] Stearamido propyldimethyl-B-hydroxyethyl ammonium nitrate (American Cyanamide Co.).
[7] Stearamido propyldimethyl-B-hydroxyethyl ammonium phosphate (American Cyanamide Co.).

As will be observed from the data in Table I, the untreated or control specimen shows a black stain on the paper towel within ten seconds, and is completely washed off to expose the surface of the substrate at one minute, nine seconds. Such performance is rated as failure of the film to pass this rainfall resistance test.

In contrast to the failure of the control specimen to pass this rainfall resistance test, each of the treated specimens exhibited zero or only slight staining of the paper towel. Further, they each showed resistance to washing off the surface of the substrate for at least ten minutes. Hence, each is rated as passing this test.

In the practice of the invention, the treating agent is preferably applied in the form of a solution thereof in water or water-miscible organic solvent such as methyl alcohol, isopropyl alcohol, or the like, and preferably by a spray application of the solution.

In instances where the aqueous emulsion is applied to the substrate surface by spray application simultaneously with the spraying of particulate material thereon, such as glass fiber, by procedure in which the sprayed fibers become coated with the emulsion before they are deposited on the substrate surface, the treating agent may be sprayed into the fanned-out spray of emulsion and glass fibers before they strike the substrate surface. Preferably, however, the spray of the treating agent is directed at such an angle that the treating agent strikes each pass of emulsion after the latter strikes the substrate surface, instead of the pass next being sprayed.

To demonstrate that the herein-described diffusion of the treating agents through the layers of aqueous bituminous emulsions does not adversely affect, to any significant extent, the physical properties of the subsequently dried films of the emulsion which are important in the use of such films as protective coatings for roofs or other surfaces exposed to the weather, the comparative tests referred to below were conducted.

These comparative test were performed on films formed from a standard, commercial asphalt emulsion. This emulsion was one in which the asphalt, constituting about 51.5% by weight of the product, was a steam-refined asphalt of about 120° F. softening point and 100–110 penetration at 77° F., emulsified in water with bentonite in an amount approximating 1.5% by weight of the product. Dixie clay in an amount representing about 5% by weight of the product was incorporated in the resultant emulsion. Thus, the water content of product was approximately 42% by weight thereof.

In carrying out these tests, a solution of 1% of diethylene triamine in 99% methanol was employed as the treating agent. This solution was applied to the surface of the sprayed layer of the above-described emulsion by spraying the solution from a supply thereof under a pressure of 50 p.s.i. Comparisons were made between the deposited film or layer treated in accordance with the invention and the same layer not so treated. The tests also included the rating of the respective deposited layers of the bituminous emulsion as to their rainfall resistance.

The results of these comparative tests are shown in the following:

TABLE II.—COMPARATIVE TESTS OF TREATED AND UNTREATED FILMS

| | Treated | Control | After One Week | | After One Month | |
|---|---|---|---|---|---|---|
| | | | Control | Treated | Control | Treated |
| Rainfall Resistance: | | | | | | |
| Indoor drying time before testing | ½ hr | 1 hr | | | | |
| Rating | Pass | Pass | | | | |
| Re-emulsification: | | | | | | |
| 1 day soak | | | None | None | None | None. |
| 7 day soak | | | do | do | do | Do. |
| Water Absorption, percent: | | | | | | |
| 1 day | | | 1.1 | 2.5 | 0.9 | 1.6. |
| 7 days | | | 2.9 | 7.2 | 1.5 | 2.2. |
| Tensile Strength, p.s.i. | | | 147 | 160 | 144 | 180. |
| Ductility at— | | | | | | |
| 77° F., percent | | | 75 | 65 | 57 | 60. |
| 40° F., percent | | | 42 | 52 | 35 | 40. |
| Oven Loss, 3 hrs., 250° F., percent | | | 0.36 | 0.34 | 0.31 | 0.36. |
| M.V.T. (Perm, Inch) | | | 0.034 | 0.032 | 0.016 | 0.012. |
| Mullen Burst, lbs | | | 74 | 65 | 70 | 94. |
| Caliper, Inches | | | 0.066 | 0.070 | 0.081 | 0.084. |
| Flexibility: | | | | | | |
| 77° F.[a] | | | Pass ⅛″ | Pass ⅛″ | Cracks ⅛″ [b] | Pass ⅛″. |
| 32° F. | | | Fail 2″ | Fail 2″ | Fail 2″ | Fail 2″. |
| Percent Glass | | | 11.6 | 10.7 | 9.6 | 10.4. |
| Gallons/100 sq. ft. | | | 6.6 | 7.0 | 8.1 | 8.5. |

[a] Size refers to mandrel diameter. [b] Very slight cracks.

The data in Table II with respect to moisture vapor transmission, Mullen burst strength and water absorption of the dried films are the results of tests conducted accordin gto ASTM test methods E96(E), D774 and D570, respectively. The data given with respect to rainfall resistance are the results based on the rainfall resistance test described above in connection with the data shown in Table I.

The results shown in Table II for flexibility of the dried film are based upon a test conducted with specimens measuring ¾ inch by 4 inches cut from the film, and bent 180° around a series of sixteen mandrels which vary from one another in diameter. The smallest diameter mandrel is of ⅛ inch diameter and the others are of progressively increasing diameter by an increment of ⅛ inch to the largest, which is of 2 inches diameter. The specimens are subjected to the above-described bending test, at a temperature of 32° F. after they as well as the mandrels are conditions for at least two hours in a refrigerator controlled to provide a temperature of 32° F. After the conditioning cycle, each sample is first bent over the largest diameter mandrel and the sample is carefully inspected for evidence of any cracking therein. If no cracking is observed, another of the specimens of the film is similarly tested on the mandrel of the next smaller diameter in the series. This procedure is continued progressively with other specimens, utilizing successively the mandrels of the series in descending order of their diameters. The size of the mandrel in use when cracking of the film is first observed by the above-described bending, is recorded.

The results shown in Table II for the ductility of the dried films are the values recorded by testing them in the standard ductility apparatus set forth in ASTM–D113, except that special clamps are utilized for holding the specimens cut from the film. Strips of paper toweling are folded around the ends of the sample to cushion it against the clamps when the assembly is placed in the ductility testing apparatus. The assembly is conditioned for one hour in the ductility bath at the test temperature. After setting the indicator of the apparatus at 0 reading, the specimen is subjeced to elongation in the apparatus, at the rate of five centimeters per minute in the case of the tests conducted at 77° F., and at the rate of 0.25 centimeter per minute when the test is conducted at 40° F. The reading of the indicator a the time of ultimate film failure is recorded. The precent ductility is computed as follows:

$v$ = reading at ultimate failure, in centimeters $$\frac{v}{5.08} \times 100 = \text{percent ductility or elongation}$$

and is recorded as the result obtained by the test.

Although there is above set forth an explanation of the manner in which the treating agents hereof function, when they have diffused through the deposited layer of the aqueous emulsion, to produce the unique and unexpected results described, it is to be understood that this is intended solely for such explanatory purpose, and is not to be regarded as restrictive of the invention.

What is claimed is:

1. The method of accelerating the normal rate of coagulation and setting-up of a coating layer consisting essentially of a bituminous binder material deposited on the surface of a substrate in the form of an aqueous emulsion of said binder material made with hydrophilic colloidal clay material as the emulsifying agent, said method consisting essentially of diffusing through said deposited layer, in the presence of substantially all the original water content thereof, an organic amine compound in an amount effective to displace the water from around the particles of clay material and to transform said particles of clay material from a hydrophilic into a hydrophobic and oleophilic character, the amount of said amine compound being such as not substantially to affect the physical properties normally characteristic of the dried coating layer resulting from subsequent elimination of the water content of said deposited layer.

2. The method of claim 1, wherein said amount of the amine compound is in the range of from about 0.05% to about 0.5%, by weight, based on the weight of said deposited layer of said emulsion.

3. The method of claim 1, wherein said amine compound is deposited on the surfaces of a particulate material deposited on the surface of said substrate simultaneously with the deposition of said aqueous emulsion on the surface of said substrate, and wherein said amine compound diffuses from said surfaces of the particulate material into and through said deposited layer of said aqueous emulsion.

4. The method of claim 1, wherein said aqueous emulsion is deposited on said surface of the substrate by spray application thereof, and wherein said amine compound is deposited on the surface of said spray-deposited layer of said emulsion by spraying said compound onto said surface of said deposited layer of said emulsion so as to diffuse from said surface into and through said deposited layer of said emulsion.

5. The method of claim 1, wherein said amine compound consists essentially of a substance selected from the group consisting of primary, secondary, and tertiary aliphatic amines, alkylaromatic amines, fatty amides of aliphatic and disubstituted diamines, quaternary ammonium bases derived from fatty amides of disubstituted diamines, fatty amides derived from benziamidazolines, basic pyridinium compounds and salts thereof, quaternary ammonium compounds, betaine compounds of quaternary ammonium, urethane salts of an alkylene diamine, polyalkylene diamines and their quaternary ammonium derivatives, and polyalkanol polyethanolamines.

6. The method of claim 1, wherein said amine compound consists essentially of a solution of diethylene triamine in methyl alcohol.

7. The method of claim 2, wherein said amine compound consists essentially of a solution of diethylene triamine in methyl alcohol.

8. The method of claim 3, wherein said amine compound consists essentially of a solution of diethylene triamine, in methyl alcohol.

9. The method of claim 4, wherein said amine compound consists essentially of a solution of diethylene triamine, in methyl alcohol.

References Cited

UNITED STATES PATENTS

| | | | |
|---|---|---|---|
| 1,506,371 | 8/1924 | Kirschbraun | 252—311.5 |
| 1,615,303 | 1/1927 | Kirschbraun | 252—311.5 |
| 1,616,904 | 2/1927 | Kirschbraun | 252—311.5 |
| 2,421,363 | 5/1947 | Young | 117—62.2 |
| 2,715,587 | 8/1955 | Armitage et al. | 117—63 |
| 2,887,366 | 5/1959 | Oberdorfer | 117—63 X |
| 2,923,641 | 2/1960 | Graf | 117—63 X |
| 2,972,588 | 2/1961 | Cohen | 117—158 X |
| 3,227,573 | 1/1966 | Axe et al. | 117—62.1 X |
| 3,255,000 | 6/1966 | Gates et al. | 117—62.2 X |

WILLIAM D. MARTIN, *Primary Examiner.*

M. LUSIGNAN, *Assistant Examiner.*

U.S. Cl. X.R.

117—27, 168; 252—311.5